(12) United States Patent
Beltowski et al.

(10) Patent No.: US 8,230,389 B2
(45) Date of Patent: Jul. 24, 2012

(54) OSGI DYNAMIC BUNDLE GENERATION AT RUNTIME

(75) Inventors: Piotr Beltowski, Kraków (PL); Wojciech Kocjan, Rybnik (PL)

(73) Assignee: International Business Machines Corporation, Armonk, NY (US)

(*) Notice: Subject to any disclaimer, the term of this patent is extended or adjusted under 35 U.S.C. 154(b) by 1027 days.

(21) Appl. No.: 12/112,883

(22) Filed: Apr. 30, 2008

(65) Prior Publication Data

US 2009/0276755 A1 Nov. 5, 2009

(51) Int. Cl.
*G06F 9/45* (2006.01)
(52) U.S. Cl. ....................................... 717/108
(58) Field of Classification Search .................... 717/108
See application file for complete search history.

(56) References Cited

U.S. PATENT DOCUMENTS

| 8,065,411 B2* | 11/2011 | Spiess et al. ............... 709/224 |
| 2004/0194059 A1* | 9/2004 | Akella et al. ................ 717/118 |
| 2005/0154785 A1 | 7/2005 | Reed et al. |
| 2005/0193388 A1 | 9/2005 | Hayes, Jr. |
| 2006/0140144 A1 | 6/2006 | Bruner et al. |
| 2007/0124510 A1 | 5/2007 | Ando |
| 2008/0046882 A1 | 2/2008 | Blackhouse |
| 2010/0262467 A1* | 10/2010 | Barnhill et al. ............... 705/10 |

FOREIGN PATENT DOCUMENTS

WO  WO 2005/528412  6/2005

OTHER PUBLICATIONS

OSGi Website: OSGi Technology, Copyright 2008 OSGi Alliance—http://www.osgi.org/About/Technology.
IBM: "Managing Uninstallation of OSGi Bundle", Aug. 23, 2007—IP.com # IPCOM000157266D.

* cited by examiner

*Primary Examiner* — John Chavis
(74) *Attorney, Agent, or Firm* — McGinn IP Law Group, PLLC

(57) ABSTRACT

A method of dynamically creating an OSGi bundle is provided, including determining a directory for creation of the OSGi bundle, a runtime environment, and an OSGi framework, determining a functionality and a data for the OSGi bundle based on the runtime environment and the OSGi framework, creating a JAR file of the OSGi bundle with the data and the functionality, creating a bundle manifest for the OSGi bundle accordingly, installing and starting the OSGi bundle; and using an activator of the OSGi bundle to any one of initialize services and perform any additional tasks. One of a main OSGi bundle and an application performs the determining, the creating, and the installing and starting. The main OSGi bundle and the application have logic that enables the determining of the functionality and the data offered by the OSGi bundle. An initialization of the services and a performance of the any additional tasks is dependent on the functionality and the data of the OSGi bundle. The main OSGi bundle includes an activator launched prior to the determining the directory. The activator of the main OSGi bundle performs the determining, the creating, and the installing and starting. The application installing and starting the OSGi bundle is framework dependent.

1 Claim, 4 Drawing Sheets

400

OSGI DYNAMIC BUNDLE GENERATION AT RUNTIME

BACKGROUND OF THE INVENTION

1. Field of the Invention

The present invention generally relates to an Open Systems Gateway Initiative (OSGi) bundle, and more specifically to an OSGi bundle dynamically created with sophisticated logic that can dynamically adapt to specific runtime environments and underlying operating systems.

2. Description of the Related Art

OSGi technology is the dynamic module system for the Java programming language. OSGi applications, called bundles, are defined by OSGi framework which standardizes the OSGi platform. OSGi is based on bundles that provide or use functionality. OSGi allows installing/uninstalling and starting/stopping through the bundles.

However, a problem with the conventional OSGi framework is that all dependencies and exported functionality need to be manifested inside a bundle. Because of this, an OSGi bundle might have different dependencies based on an operating system running on a specific machine. Different dependencies also may be based on specific OSGi framework implementations existing in the machine (for example, Common Agent Services (CAS) framework requires additional logging). Also, different dependencies may be based on specific software installed on the machine.

The OSGi standard requires that all required dependencies and all native code be specified in the bundle manifest, which has to be put in the bundle—which makes it impossible to use native code based on machine specific details. As all dependencies and all native code need to be specified in the bundle manifest, it is difficult to use different pieces of native code based on the present hardware specific details.

SUMMARY OF THE INVENTION

In view of the foregoing and other exemplary problems, drawbacks, and disadvantages of the conventional methods and structures, an exemplary feature of the present invention is to provide a method of dynamically creating an OSGi bundle after verifying which functionality the bundle should provide and which packages/native code is available.

Another exemplary feature of the present invention is the creation of a single multipurpose OSGi bundle with sophisticated logic inside that can dynamically adapt to specific runtime environments and underlying operating systems.

An exemplary embodiment of the present invention includes a method of dynamically creating an OSGi bundle, including determining a directory for creation of the OSGi bundle, a runtime environment, and an OSGi framework, determining a functionality and a data for the OSGi bundle based on the runtime environment and the OSGi framework, creating a JAR file of the OSGi bundle with the data and the functionality, creating a bundle manifest for the OSGi bundle accordingly, installing and starting the OSGi bundle; and using an activator of the OSGi bundle to any one of initialize services and perform any additional tasks. One of a main OSGi bundle and an application performs the determining, the creating, and the installing and starting. The main OSGi bundle and the application have logic that enables the determining of the functionality and the data offered by the OSGi bundle. An initialization of the services and a performance of the any additional tasks is dependent on the functionality and the data of the OSGi bundle. The main OSGi bundle includes an activator launched prior to the determining the directory. The activator of the main OSGi bundle performs the determining, the creating, and the installing and starting. The application installing and starting the OSGi bundle is framework dependent.

According to the aforementioned exemplary embodiment, instead of using a conventional single multipurpose bundle in the conventional method, a separate native/Java application can be used to locate OSGi framework implementation, dynamically create the new bundle, and deploy it into operation on the machine.

The aforementioned exemplary embodiment of the present invention may provide a dynamically created OSGi bundle that is able to run various implementations of classes, depend on different bundles/JARs, and optionally load different sets of native code. Installation and deployment logic could be embedded in the single multipurpose bundle or application and all products using the components would not need to adapt to changing installation methods.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

An OSGi bundle may be dynamically created after verifying which functionality the bundle should provide and which packages/native code it can use. The OSGi bundle can be dynamically created by either creating the OSGi bundle with relevant functionality and dependencies determined by another OSGi bundle or by providing a separate native or Java-based application to locate the OSGi framework implementation. The bundle shall be created in a well known location on a file system.

The dynamically created bundle includes a JAR file copied into the framework repository. The contents of the JAR file might also be extracted into the file system. The JAR file is checked to ensure it is up to date. The contents of the dynamically created bundle depend on the operating system being utilized, the available native libraries, and the OSGi framework and version. The dependant data chosen to be contents of the dynamically created bundle is stored in the manifest file of dynamically created bundle.

Figure 1:
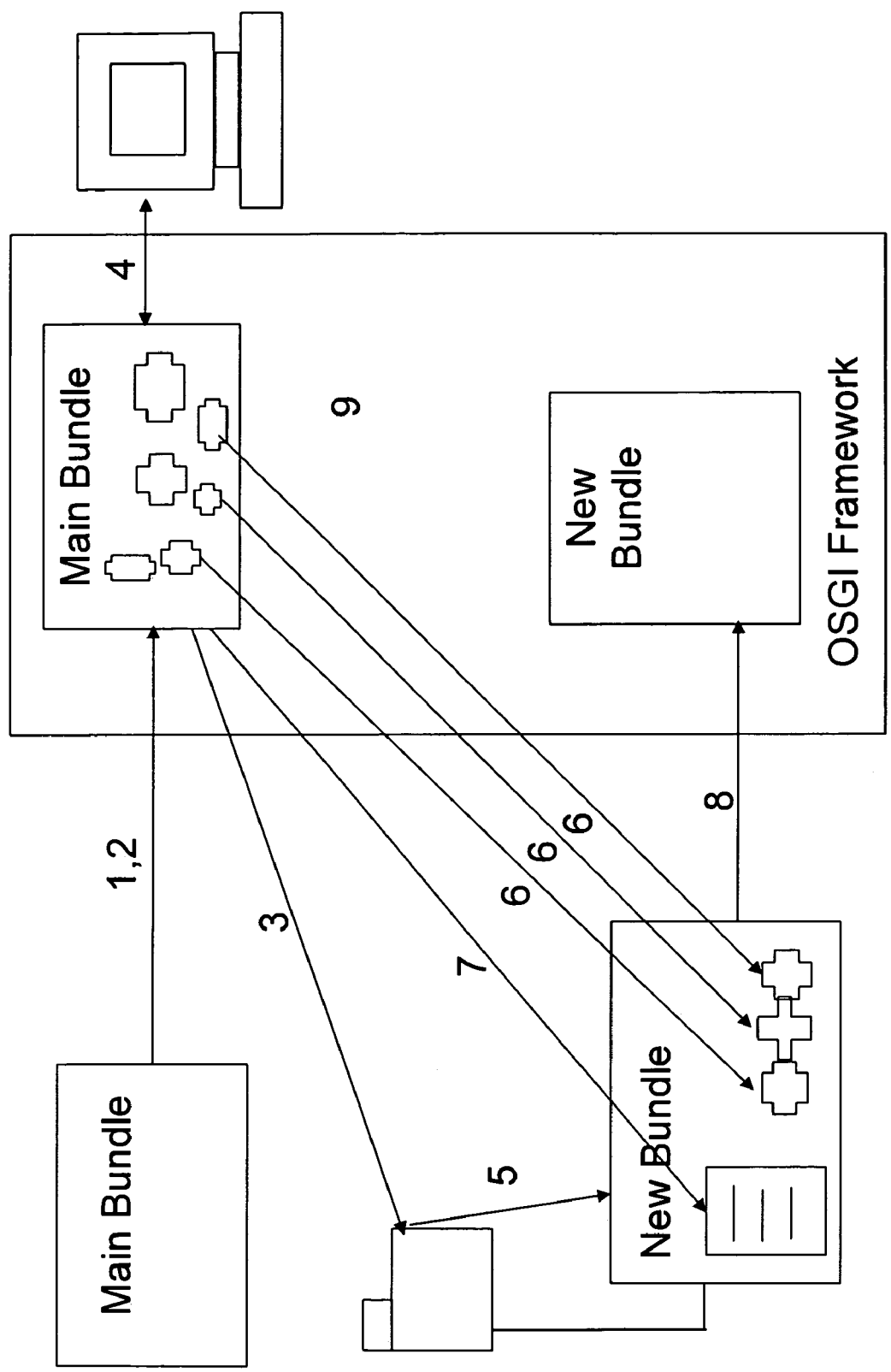
FIG. 1 illustrates an exemplary method of dynamically creating an OSGi bundle with relevant functionality and dependencies determined by another OSGi bundle.
Figure 2:
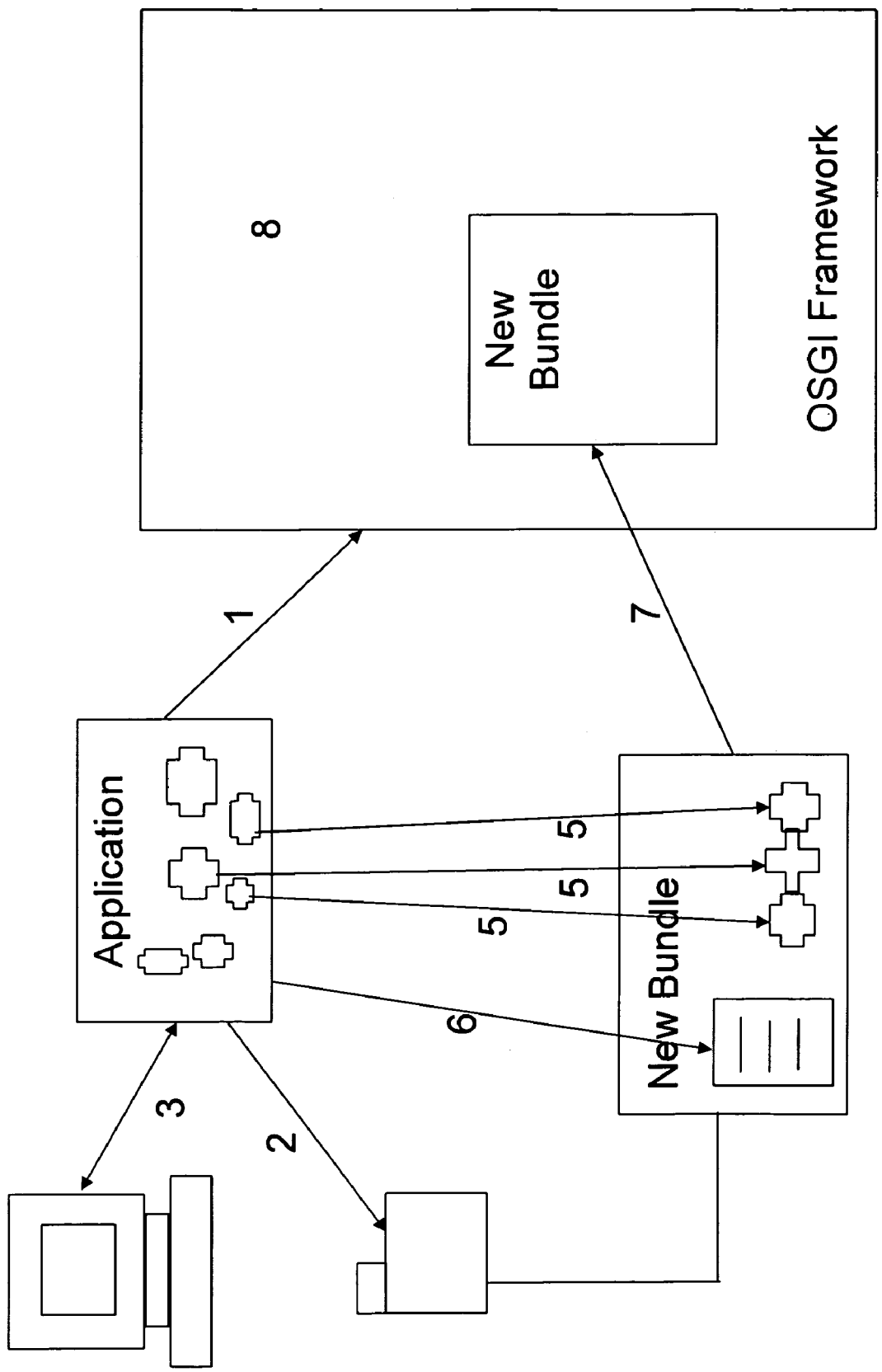
FIG. 2 illustrates an exemplary method of dynamically creating an OSGi bundle by providing a separate native or Java-based application to locate the OSGi framework implementation.

Exemplary methods of dynamic creation of the OSGi bundle are described with respect to FIGS. 1 and 2. One exemplary method is shown with respect to FIG. 1 and involves creating the NEW BUNDLE with relevant functionality and dependencies determined by another OSGi bundle. In this description, for purposes of clarity and differentiation, the dynamically created bundle is referred to as NEW BUNDLE and the other OSGi bundle mentioned above is referred to as MAIN BUNDLE, but are not limited to these particular names. The NEW BUNDLE could be created from the MAIN BUNDLE. This means that the bundle contains compiled Java code, but only provides an activator which creates the NEW BUNDLE upon MAIN BUNDLE activation. For example, on Linux machines, such a bundle might use native code that uses "librpm" library on RPM based systems, but uses "libapt-pkg" library on DPKG and APT based systems.

FIG. 1 (e.g., including exemplary steps 1-9) shows an exemplary method of creating a NEW BUNDLE from a MAIN BUNDLE. First, a MAIN BUNDLE is installed in the OSGi framework. This means that the bundle JAR file is copied into framework's repository; the contents might also be extracted into the file system as well. Second, the MAIN BUNDLE is started in the OSGi framework. The MAIN BUNDLE activator is launched.

Third, the MAIN BUNDLE Activator determines the directory used for a NEW BUNDLE creation. Fourth, the MAIN BUNDLE Activator determines what should be put in the NEW BUNDLE. The MAIN BUNDLE Activator's determination is dependent upon the specific operating system, available native libraries, and OSGi framework name and version.

Fifth, the MAIN BUNDLE Activator checks if the NEW BUNDLE JAR file was already created and is up to date. This may be done by using a version string/date and checking if the version in the MAIN BUNDLE is the same as the version in the NEW BUNDLE. Additional tests might be done using a checksum (i.e., MD5) of both version string and other information representing values on which the NEW BUNDLE generation depends. Items that affect NEW BUNDLE functionality include operating system, OSGi framework name and version, and available native libraries. Data might be used here that was collected during the determination by the MAIN BUNDLE Activator that determines the contents of the NEW BUNDLE.

Sixth, the MAIN BUNDLE Activator copies data and resources into the NEW BUNDLE, specifically into the JAR file. This involves creating a JAR file in the directory that was determined earlier. Seventh, the MAIN BUNDLE Activator creates the NEW BUNDLE manifest (META-INF/MANIFEST.MF file). The data that goes to the manifest file should be determined by the determination by the MAIN BUNDLE Activator that determines the contents of the NEW BUNDLE.

Eighth, the MAIN BUNDLE Activator installs and starts the previously created NEW BUNDLE. This requires installing and starting the NEW BUNDLE JAR file. Ninth, a NEW BUNDLE Activator initializes services and/or performs any additional tasks. This is dependent on the functionality that a specified bundle offers.

Another exemplary method is shown with respect to FIG. 2 (e.g., including exemplary steps 1-8) and involves providing a separate native or Java-based application to locate the OSGi framework implementation, to dynamically create the NEW BUNDLE and to deploy the NEW BUNDLE. This is an external application that locates an OSGi framework, dynamically creates the NEW BUNDLE, installs and starts the NEW BUNDLE in the OSGi framework. An example of such a situation is a diagnostic tool for either the OSGi framework itself or for components/products using the OSGi framework. The diagnostic tool could determine which tests to perform and create an NEW BUNDLE to execute them.

FIG. 2 shows an exemplary method of creating a NEW BUNDLE from a separate native or Java-based application. First, the application locates OSGi framework. Second, the application determines the directory used for NEW BUNDLE creation. Third, the application determines what should be put in the NEW BUNDLE based on the operating system, available native libraries, and OSGi framework name and version.

Fourth, the application determines whether the NEW BUNDLE JAR file has already been created and is up to date. This can be done by using a version string/date and checking if the version in the MAIN BUNDLE is the same as the version in the NEW BUNDLE. Additional tests might be done using a checksum (i.e., MD5) of both version string and other information representing values on which the NEW BUNDLE generation depends. Items that affect NEW BUNDLE functionality include operating system, OSGi framework name and version, and available native libraries. Data might be used here that was collected during the determination by the application that determines the contents of the NEW BUNDLE.

Fifth, the application copies data and resources into the NEW BUNDLE (JAR file). This involves creating a JAR file in the directory that was determined earlier. Sixth, the application creates the NEW BUNDLE manifest (META-INF/MANIFEST.MF file). The data that goes to the manifest file should be determined by the determination by the application that determines the contents of the NEW BUNDLE.

Seventh, the application installs and starts the previously created NEW BUNDLE. This requires installing and starting the NEW BUNDLE JAR file. This particular operation might be framework dependent. For example, on Common Agent Services (CAS), this requires invoking agent Common Language Infrastructure (CLI) utilities.

Eighth, the NEW BUNDLE Activator initializes services and/or performs any additional tasks. This is dependent on the functionality that a specified bundle offers.

Figure 3:
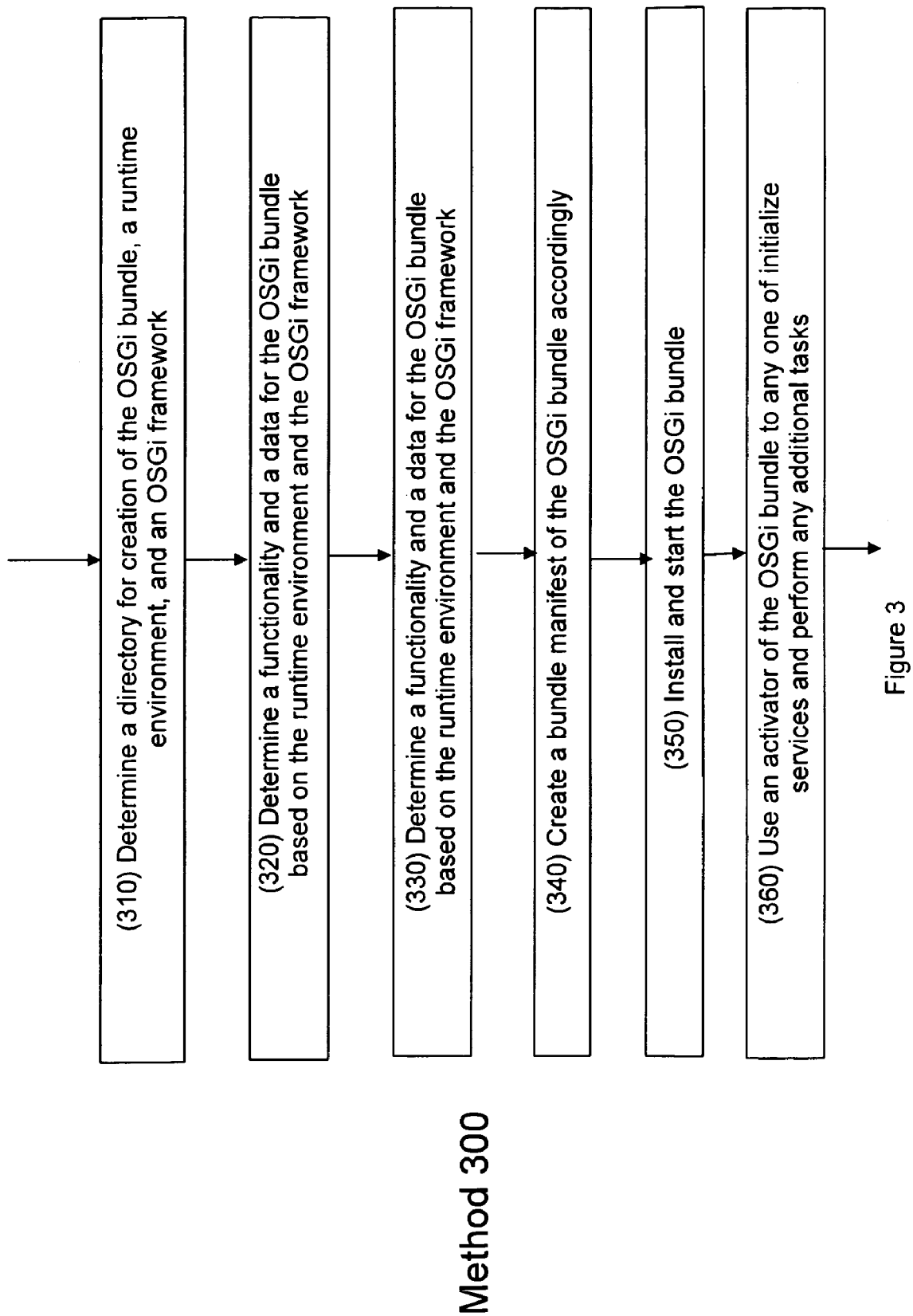
FIG. 3 illustrates an exemplary method 300 of dynamically creating an OSGi bundle according to the exemplary aspects of the present invention.

Referring again to the drawings, FIG. 3 illustrates an exemplary method 300 of dynamically creating an OSGi bundle according to the exemplary aspects of the present invention. As illustrated in FIG. 3, the method 300 includes determining (310) a directory for creation of the OSGi bundle, a runtime environment, and an OSGi framework, determining (320) a functionality and a data for the OSGi bundle based on the runtime environment and the OSGi framework, creating (330) a JAR file of the OSGi bundle with the data and the functionality, creating (340) a bundle manifest for the OSGi bundle accordingly, installing and starting (350) the OSGi bundle; and using (360) an activator of the OSGi bundle to any one of initialize services and perform any additional tasks.

In method 300, one of a main OSGi bundle and an application performs the determining, the creating, and the installing and starting. Further, the main OSGi bundle and the application have logic that enables the determining of the functionality and the data offered by the OSGi bundle. An initialization of the services and a performance of the any additional tasks is dependent on the functionality and the data of the OSGi bundle. The main OSGi bundle includes an activator launched prior to the determining the directory. The activator of the main OSGi bundle performs the determining, the creating, and the installing and starting. The application installing and starting the OSGi bundle is framework dependent.

Figure 4:
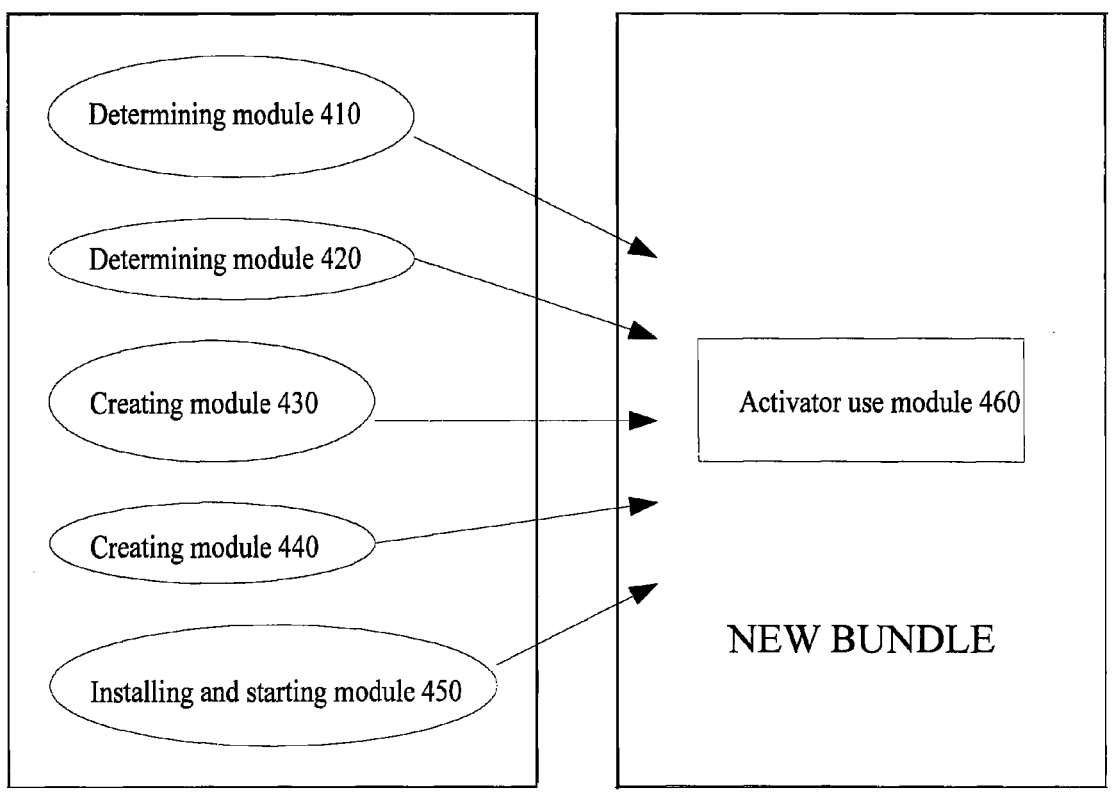
FIG. 4 illustrates a system 400 for dynamically creating an OSGi bundle according to an exemplary aspect of the present invention.

FIG. 4 illustrates a system 400 for dynamically creating an OSGi bundle according to an exemplary aspect of the present invention. The system 400 includes a determining module 410 for determining a directory for creation of the OSGi bundle, a runtime environment, and an OSGi framework, a determining module 420 for determining a functionality and a data for the OSGi bundle based on the runtime environment and the OSGi framework, a creating module 430 for creating a JAR file of the OSGi bundle with the data and the functionality, a creating module 440 for creating a bundle manifest for the OSGi bundle accordingly, an installing and starting module 450 for installing and starting the OSGi bundle, and an activator use module 460 for using an activator of the OSGi bundle to any one of initialize services and perform any additional tasks.

Again, according to the aforementioned exemplary embodiment, instead of using a conventional single multipurpose bundle in the conventional method, a separate native/Java application can be used to locate OSGi framework implementation, dynamically create the new bundle, and deploy it into operation on the machine.

The aforementioned exemplary embodiment of the present invention may provide a dynamically created OSGi bundle that is able to run various implementations of classes, depend on different bundles/JARs, and optionally load different sets of native code. Installation and deployment logic could be embedded in the single multipurpose bundle or application and all products using the components would not need to adapt to changing installation methods.

While the invention has been described in terms of several exemplary embodiments, those skilled in the art will recognize that the invention can be practiced with modification within the spirit and scope of the appended claims. Further, it is noted that, Applicant's intent is to encompass equivalents of all claim elements, even if amended later during prosecution.

What is claimed is:

1. A method of dynamically creating an OSGi bundle, comprising:

determining a directory for creation of said OSGi bundle, a runtime environment, and an OSGi framework;

determining a functionality and a data for said OSGi bundle based on said runtime environment and said OSGi framework after said determining said directory;

creating a JAR file of said OSGi bundle with said data and said functionality after said determining said functionality and said data;

creating a bundle manifest for said OSGi bundle accordingly after said creating said JAR file;

installing and starting said OSGi bundle after said creating said bundle manifest; and using an activator of said OSGi bundle to any one of initialize services and perform any additional tasks after said installing and starting said OSGi bundle, wherein one of a main OSGi bundle and an application performs said determining, said creating, and said installing and starting, wherein said main OSGi bundle and said application have logic that enables said determining of said functionality and said data offered by said OSGi bundle, wherein an initialization of said services and a performance of said any additional tasks is dependent on said functionality and said data of said OSGi bundle, wherein said main OSGi bundle comprises an activator launched prior to said determining said directory, wherein said activator of said main OSGi bundle performs said determining, said creating, and said installing and starting, and wherein said application installing and starting said OSGi bundle is framework dependent.

* * * * *